United States Patent [19]
Razdan et al.

[11] 3,855,229
[45] Dec. 17, 1974

[54] BENZOPYRAN-5-OLS
[76] Inventors: Raj K. Razdan, 76 Lawrence Ln., Belmont, Mass. 02178; William R. Thompson, 77 Sacramento St., Somerville, Mass. 02143
[22] Filed: Feb. 28, 1973
[21] Appl. No.: 336,877

Related U.S. Application Data
[63] Continuation of Ser. No. 164,145, July 19, 1971, abandoned.

[52] U.S. Cl.......... 260/293.58, 260/293.77, 424/267
[51] Int. Cl.............................................. C07d 29/16
[58] Field of Search................................ 260/293.58

[56] References Cited
OTHER PUBLICATIONS
Adams et al., J. Am. Chem. Soc., 63, 1973–1976 (1941).
Moffett, J. Med. Chem. 7, 446–449 (1964).
Russell et al., J. Chem. Soc., 1941, 169–172.

*Primary Examiner*—G. Thomas Todd

[57] ABSTRACT

Dimethyl-pentyl-piperidyl-benzopyran-5-ols, analogs and derivatives thereof having anti-depressant and analgesic properties are provided as well as the coumarin intermediates therefor. A typical compound is 2,2-dimethyl-7-pentyl-4-[1-(2-phenylethyl)-4-piperidyl]-2H-1-benzopyran-5-ol and a typical coumarin intermediate is 4-(1-benzoyl-4-piperidinyl)-5-hydroxy-7-pentyl coumarin. The benzopyran-5-ols can be converted to the corresponding dihydrobenzopyrans.

3 Claims, No Drawings

BENZOPYRAN-5-OLS

This is a continuation of application Ser. No. 164,145 filed July 19, 1971, now abandoned.

This invention relates to piperidinyl benzopyran-5-ols and to coumarin intermediates therefor. Compounds according to the present invention have pharmacodynamic activity as psychotropic agents for antidepressant and anti-anxiety use and as pain-relieving analgesics.

Co-pending application Ser. No. 630,808 filed Apr. 14, 1967 describes inter alia a group of compounds having the formula:

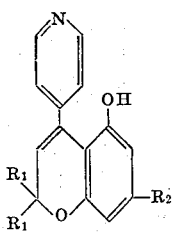

wherein each $R_1$ is lower-alkyl, especially methyl, and $R_2$ is alkyl of one to 20 carbon atoms or cycloalkyl-lower-alkyl, wherein cycloalkyl has a saturated ring of three to eight carbon atoms.

It has now been found that novel compounds similar to those described in said application Ser. No. 630,808 may be prepared by the procedure of Granchelli application Ser. No. 172,582, filed Oct. 31, 1969, and described hereinafter.

Accordingly, the present invention provides compounds of the formula:

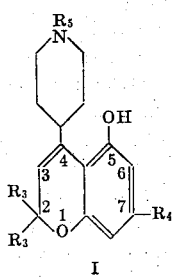

and pharmaceutically acceptable acid-addition salts and N-oxides thereof, wherein $R_3$ is straight chain or branched lower alkyl having 1 – 6 carbon atoms, preferably methyl;

$R_4$ is halogen or an unsubstituted or substituted aliphatic hydrocarbon having 1 – 24 carbon atoms, preferably pentyl, and $R_5$ is H, lower-alkanoyl, cycloalkyl-lower-alkyl, cycloalkyl-lower-alkanoyl, lower-alkenyl, lower-alkynyl, halo-lower-alkenyl in which halo is fluoro, chloro, bromo or iodo, phenyl-lower-alkyl, phenyl-lower alkenyl, or phenyl-lower-alkynyl, or acyl.

The OH group in the 5-position may also be in the form of an ester or ether derivative. The piperidine group is usually attached to the pyran ring at the 4-position of the piperidine ring as shown but may be at the 3-position.

The term aliphatic or aryl aliphatic hydrocarbon includes, for example, straight and branched chain alkyl, cycloalkyl (having a ring structure of 3 – 8 carbon atoms), alkenyl, alkynyl and combinations thereof.

$R_3$ is, for example, preferably methyl, but may also be ethyl, propyl, butyl and the like.

$R_4$ is, for example, pentyl, but may also be methyl, n-hexyl, 2-heptyl, n-heptyl, 3-methyl-2-octyl, n-nonyl, 2-nonyl, decyl, dodecyl, 2-tetradecyl, n-hexadecyl, 2-eicosanyl, cyclopropyl, cyclobutyl, 2-methyl cyclobutyl, cyclohexyl, 4-methyl cyclohexyl, cyclooctyl, cyclohexylmethyl, chloro and the like.

$R_5$ is, for example, hydrogen, methyl, propyl, sec-butyl, decyl, tetracosanyl, 2-allyl, 2-butenyl, 1-methylvinyl, propargyl, 2-penten-4-ynyl, cyclopropylmethyl, cyclohexylhexyl, 2-phenylethyl, benzyl or acyl such as benzoyl.

Due to the ionic nature of the nitrogen in the piperidine ring of formula I it is possible to form acid addition salts for example with HCl, HBr, HI and picric acid $[(NO_2)_3C_6H_2OH]$. Any of the compounds of formula I may be converted to acid addition salt form by dissolving the compound in an aqueous solution containing the appropriate acid and isolating the salt by evaporating the solution. N-oxides may be made by treatment with suitable oxidizing agents, e.g., hydrogen peroxide.

It will thus be appreciated that the scope of the present invention includes compounds I and the acid addition salts and N-oxides of the compounds of the present invention.

In utilizing the pharmacodynamic acitivity of the salts of the invention, we prefer to use pharmaceutically acceptable non-toxic salts. Although water insolubility, high toxicity, or lack of crystalline character may make some particular salt species somewhat less desirable for use as such in a given pharmaceutical application, the water-insoluble or toxic salts can be converted to pharmaceutically acceptable compounds by techniques per se well known in the pharmaceutical art.

It will be appreciated from the foregoing that all of the acid addition salts of our new compounds are useful and valuable compounds regardless of considerations of solubility, toxicity, physical form, and the like, and accordingly are within the scope of the present invention.

Various derivatives of the hydroxy group of the compounds of the present invention may also be made by conventional means, by replacing the hydrogen of the OH radical with etherifying or esterifying substituents such as acetyl, lower alkyl, phosphate, dialkylaminoalkyl and the like. In this way solubility or other properties may be modified, varied or controlled.

The compounds I of the present invention are prepared by procedure described in the said Granchelli application, which process comprises in part reacting a coumarin derivative of the formula:

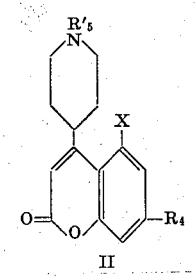

wherein $R'_5$ is an electron withdrawing group for the N atom such as benzoyl or other acyl, and $R_4$ and X have the above meanings, with a compound of the formula $R_3MgX'$ in which $X'$ is chlorine, bromine or iodine and $R_3$ has the above meaning, at elevated temperature to form a compound of the formula:

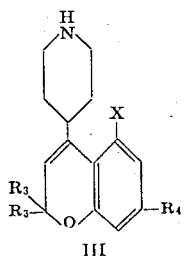

III wherein $R_3$, $R_4$ and X have the above meanings, and optionally converting the NH group to a group $NR_5$ in which $R_5$ has any of the meanings set forth above, other than hydrogen.

The Granchelli procedure in its particular form is as follows, it being understood that the other compounds of the invention can be similarly prepared.

I. PREPARATION OF ETHYL TERT.-BUTYL MALONATE

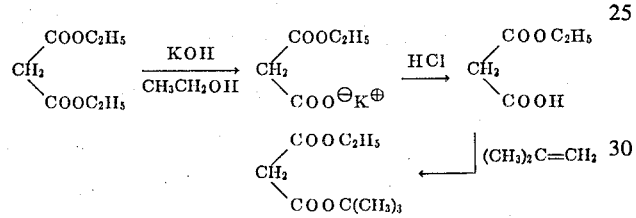

The procedure of Breslow, Baumgarten, and Hauser [J. Am. Chen. Soc., 66, 1286 (1944)] was followed to make the ethyl hydrogen malonate.

To a solution of 1,025.1 g (6.4 moles) of diethylmalonate (dried over Drierite) in 4100 ml of absolute alcohol was added 359.1 g (6.4 moles) of potassium hydroxide in 4,100 ml of absolute alcohol over 2.5 hrs. The mixture was allowed to stand overnight at room temperature. It was heated to reflux in the morning and filtered hot through a pre-heated sinter-glass funnel to remove the di-potassium salt. The filtrate was cooled and the crystalline mono-potassium salt was filtered and dried in vacuo. The filtrate was taken down to a low volume on a rotary evaporator to yield a second crop of the mono-potassium salt. The weight of the combined crops was 838 g.

The salt was dissolved in 1,200 ml of water and treated with 430 ml of concentrated hydrochloric acid to pH 1. Extraction with ether and subsequent evaporation yielded 480.2 g. (57 percent) of ethyl hydrogen malonate as a pale yellow oil.

The procedure described by Strube, "Organic synthesis," Coll. Volume IV, 417 (1963) was followed to prepare the ethyl tert.-butyl malonate from ethyl hydrogen malonate.

To a solution of 250 ml of ether and 15.6 ml. of concentrated sulfuric acid in a pressure bottle, cooled in an icesalt bath, was added 314 ml (3.31 moles) of isobutylene and 242.6 g (1.84 moles) of ethyl hydrogen malonate. The closed system was shaken at room temperature overnight. The system was vented in the morning and the solution was poured into 126 g of sodium hydroxide in 375 ml of water and 375 g of ice. The system was extracted with ether and evaporated in vacuo to give a nearcolorless oil. The oil was distilled at 21 mm over $K_2CO_3$ (100°). 254 g of pure ethyl tert.-butyl malonate was isolated.

II. PREPARATION OF N-BENZOYLISONIPECOTIC ACID

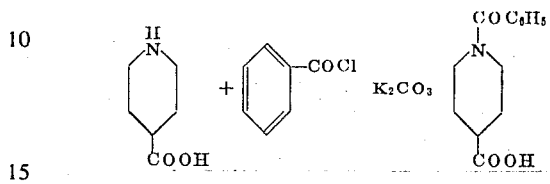

The procedure described by DeGraw, et al., J. Het. Chem., 3(1), 67–9 (1966) was followed. To a solution of 195 g (1.5 moles) of isonipecotic acid and 390 g of $K_2CO_3$ in 3 liters of water, cooled to 5°, was added 175.8 ml (1.5 mole) of benzoyl chloride over 20 min. After stirring at 5° for 30 minutes and at room temperature overnight, the solution was acidified to pH 1 with 800 ml of 6N hydrochloride acid. Extraction with methylene chloried and evaporation of the solvent gave a white solid. Recrystallization from hot benzene and cyclohexane gave 270 g (77 percent) of the product, m.p. 128°–131°.

III. PREPARATION OF N-BENZOYLISONIPECOTINYL TERT.-BUTYL ETHYL MALONATE

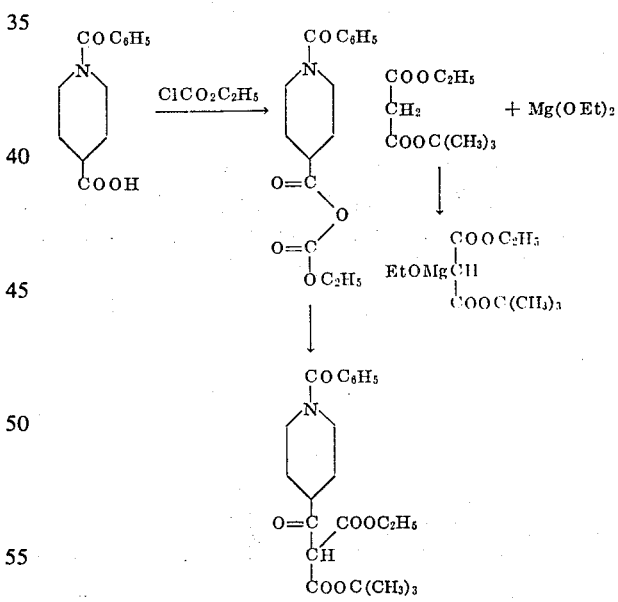

To a two-liter flask equipped with stirrer, condenser, drying tubbe, dropping funnel, and nitrogen line (which had been flame-dried) was added 61.8 g (0.54 mole) of magnesium ethoxide (prepared from magnesium powder and absolute ethanol in xylene at 85°) and 500 ml of dry ether. To the stirring slurry was added 101.6 g (0.54 mole) of ethyl tert.-butyl malonate over 25 minutes. Reflux was continued for 1 hour and then the ether was removed on the water aspirator. Two hundred ml of dry benzene was added and removed initially on the water aspirator and finally on the vacuum pump.

Simultaneously, to a 2-liter flask equipped with stirrer, thermometer, drying tube, dropping funnel, and nitrogen line (which had been flame-dried) was added 126.6 g (0.54 mole) of N-benzoylisonipecotic acid, 75.2 ml of triethylammine (distilled from KOH), and 800 ml of dry toluene. The mixture was cooled to 0°–5° and 58.3 g (0.54 mole) of ethyl-chloroformate was added over 20 minutes. The reaction mixture was stirred an additional 30 minutes at 0°–5° and then the dry ethoxymagnesioethyl-tert.-butyl malonate in 300 ml of dry ether and 150 ml. of dry benzene was added over 20 minutes. The mixture was then stirred at 0°–5° for 1.5 hours. It was stirred in 1 liter of water for 20 minutes and then the white solid was filtered and washed copiously with water, followed by ether. The solid was partitioned between 1,500 ml of ether and 1,400 ml of 2N sulfuric acid while being cooled in an ice-bath. After stirring for 15 minutes, the two phases were separated and the aqueous phase was extracted with ether. The combined ether phases were washed with water to neutrality, dried over anhydrous magnesium sulfate, and evaporated in vacuo. The product remained as a yellow oil, 137.2 g (63 percent).

IV. PREPARATION OF ETHYL-β-OXO-4-PIPERIDINE-N-BENZOYLPROPIONATE

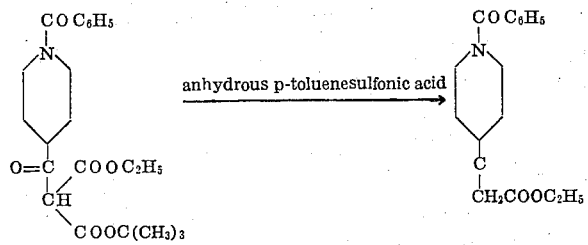

To a solution of 137.2 g of the diester in 600 ml of dry benzene was added ~24 g of anhydrous p-toluenesulfonic acid (dried by azeotropic removal of the water with toluene immediately prior to use). The solution was refluxed for 2 hours and was then cooled and washed consecutively with water, potassium bicarbonate solution, and again with water. Drying over anhydrous magnesium sulfate and evaporation yielded a near-colorless oil, 100.8 g (98 percent).

V. PREPARATION OF 4-(1-BENZOYL-4-PIPERIDINYL)-5-HYDROXY-7-PENTYLCOUMARIN

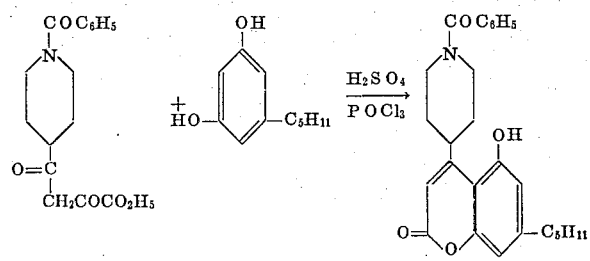

To a mixture of 70.3 g (0.23 mole) of the β-keto ester and 41.46 g (0.23 mole) of olivetol, being cooled in an ice-bath, was added 171.5 ml of concentrated sulfuric acid over 2 hours and then 103 ml of phosphorous oxychloride all at once. The mixture was stirred at room temperature for 2 days. It was then poured, with caution, onto ice while being cooled in an ice-bath. The aqueous phase was decanted from the insoluble yellow gum. The gum was triturated with potassium bicarbonate solution to pH 8. The aqueous phase was decanted and the gum was partitioned between methylene chloride and aqueous potassium bicarbonate to pH 8. The aqueous phase was extracted with methylene chloride. Drying and evaporation of the solvent yielded a dark yellow foam which, upon trituration with cold absolute alcohol, formed a white solid, m.p. 216°–219°, 17.8 g (18.5 percent).

Anal. Calcd. for $C_{26}H_{29}NO_4$: C, 74.44; H, 6.97; N, 3.34
Found: C, 74.50; H, 6.70; N, 3.49.

VI. PREPARATION OF 2,2-DIMETHYL-7-PENTYL-4-(4-PIPERIDINYL)-2H-1-BENZOPYRAN-5-OL

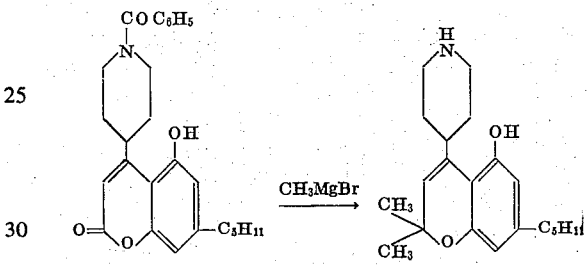

The Grignard reagent was prepared from 10.9 g (0.45 mole) of magnesium turnings in 500 ml of ether. Approximately 400 ml of ether was then distilled out and replaced with 300 ml of dry benzene. The flask was cooled and 12.8 g. (0.03 mole) of the coumarin was added all at once. The mixture was stirred at 55°–60° for 3 days under a nitrogen atmosphere. The excess Grignard was then destroyed with ammonium chloride solution. Methylene chloride was added and the system was stirred while being acidified with 4N sulfuric acid. The aqueous phase was extracted with methylene chloride. Drying and evaporation of the solvent gave a dark residue which was heated at 110° for 2 hours in 100 ml of acetic acid. Upon cooling, the reaction mixture was poured into 1200 ml of water and neutralized with solid sodium carbonate to pH 8. Extraction into ether and subsequent drying and evaporation of the solvent gave a brown residue which, upon treatment with acetonitrile, formed a beige solid, m.p. 197°–199°, 2.8 g (28 percent).

VII. PREPARATION OF 2,2-DIMETHYL-7-PENTYL-4-[1-(2-PROPYNYL)-4-PIPERIDYL]-2H-1-BENZOPYRAN-5-OL

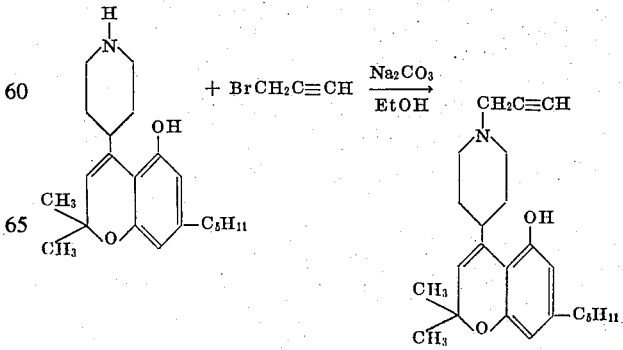

A mixture of 1 g (0.003 mole) of the nor base, 70 ml of absolute alcohol, 0.41 g (0.003 mole) of anhydrous sodium carbonate, and 0.36 g (0.003 mole) of freshly distilled propargyl bromide was heated at 50° for 2 hours and at 80°–85° for 15 hours. The solution was cooled and filtered and the filtrate was evaporated to dryness. The residue was extracted with 20 ml of boiling acetonitrile and the extract filtered hot and cooled in the freezer. A small amount of dark, gummy material precipitated out. The light, yellow solution was decanted off and stored in the freezer for an additional time to give 484 mg (44 percent) of a yellow crystalline solid, m.p. 152°. 50 mg recrystallized again from 2.8 ml of acetonitrile gave 31 mg of the product, m.p. 153°–155°.

Anal. Calcd. for $C_{24}H_{33}NO_2$: C, 78.43; H, 9.05; N, 3.81

Found: C, 78.21; H, 9.07; N, 4.31.

VIII. PREPARATION OF 4-(1-ALLYL-4-PIPERIDYL)-2,2-DIMETHYL-7-PENTYL-2H-1-BENZOPYRAN-5-OL

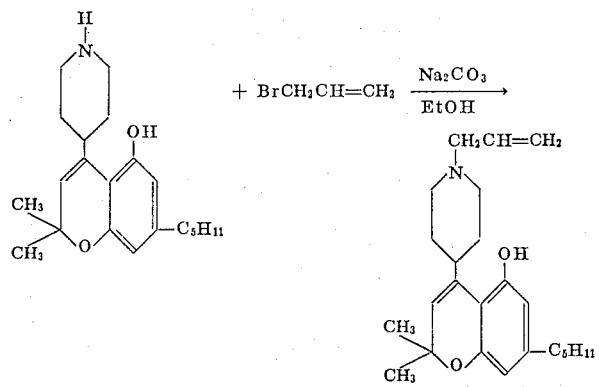

As with the propargyl derivative a mixture of 1 g (0.003 mole) of the nor base, 40 ml of absolute alcohol, 0.41 g (0.003 mole) of anhydrous sodium carbonate, and 0.36 g (0.003 mole) of allyl bromide was heated with stirring at 65° overnight. The mixture was worked up as before and the crude material was recrystallized from acetonitrile. After passage through a "florosil" column with methanol and again recrystallized from acetonitrile, 341 mg (31 percent) of the desired allyl derivative was obtained, m.p. 118°.

Anal. Calcd. for $C_{24}H_{35}NO_2$: C, 78.00; H, 9.55; N, 3.79 Found: C, 78.10; H, 9.53; N, 3.89.

IX. PREPARATION OF 2,2-DIMETHYL-7-PENTYL-4-[1-(2-PHENYLETHYL)-4-PIPERIDYL]-2H-1-BENZOPYRAN-5-OL

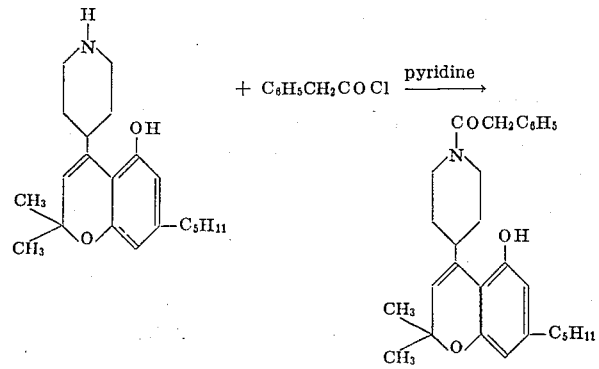

A solution of 0.47 g (0.003 mole) of phenyl acetyl chloride in 7 ml of dry benzene was added dropwise with stirring to a solution of 1 g (0.003 mole) of the nor base in 7 ml of dry pyridine and 5 ml of dry benzene. The mixture was refluxed for 3 hours, cooled and evaporated to dryness. The residue was diluted with water and extracted with dichloromethane. The extract was washed with water and then with saturated aqueous sodium chloride. It was dried over sodium sulfate and evaporated to dryness. The resulting amide was used directly without further purification in the next step.

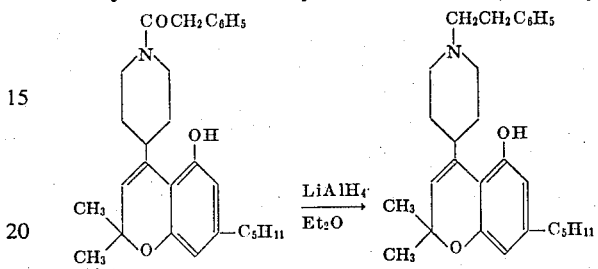

The amide (1 g; 0.0022 mole) in 20 ml of dry ether was added dropwise to a stirred suspension of 115 g (0.04 mole) of lithium aluminum hydride in 25 ml of dry ether. The mixture was refluxed for 20 hours, cooled and carefully decomposed with 10 ml of water. The solution was filtered and the large amount of solid was washed with ether. The combined ether solution was washed with water and dried over sodium sulfate. Evaporation of the ether and trituration of the residue with acetonitrile gave 0.67 g (69 percent) of a colorless solid, m.p. 133°–145°. 100 mg of the crude product was recrystallized from 3 ml of alcohol to give 50 mg of the phenethyl analog, m.p. 160°–161°.

Anal. Calcd. for $C_{29}H_{39}NO_2$: C, 80.32; H, 9.07; N, 3.23

Found: C, 80.35; H, 9.19; N, 3.17.

X. PREPARATION OF 4-(1-CYCLOPROPYLMETHYL-4-PIPERIDYL)-2,2-DIMETHYL-7-PENTYL-2H-1-BENZOPYRAN-5-OL

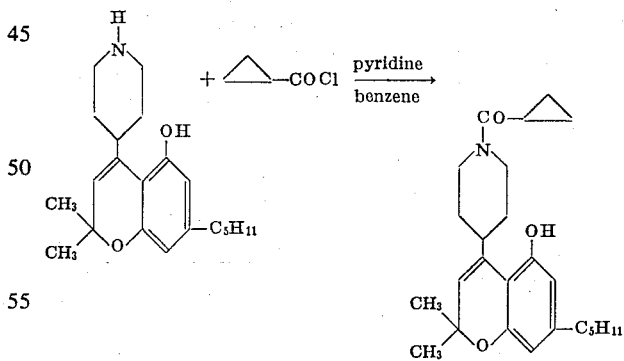

A solution of 0.47 g (0.0045 mole) of cyclopropyl-carboxylic acid chloride in 10 ml of dry benzene was added dropwise to 1.5 g (0.0045 mole) of the nor base in a mixture of dry pyridine and 5 ml of dry benzene. The mixture was refluxed for 2 hours and cooled overnight. The solution was filtered and the filtrate was evaporated to dryness. The dark, oily residue was triturated and scratched under warm water until solidification occurred. The solid was filtered and washed with water to give 1.62 g (91 percent), m.p. 135°–138°, of the amide.

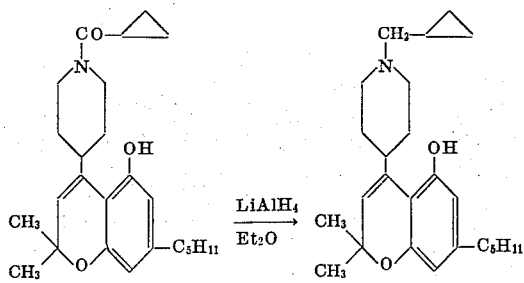

The amide in 175 ml of dry ether was added with stirring to a mixture of 1.5 g of lithium aluminum hydride in about 20 ml of dry ether. The mixture was refluxed overnight and carefully decomposed with water. The ether solution was decanted and the salts washed with more ether. The ether solution was dried over sodium sulfate and evaporated to give a solid which was triturated with acetonitrile. The product was recrystallized from 10-15 ml of acetonitrile and the near colorless crystals were filtered and washed with cold acetonitrile to yield 712 mg, m.p. 75°–78°.

Anal. Calcd. for $C_{25}H_{37}NO_2$: C, 78.28; H, 9.72; N, 3.65

Found: C, 78.23; H, 9.79; N, 3.56.

The compounds of formula I have been shown to possess beneficial central nervous system activity as evidenced by parenteral and oral administration in mice and rats in standard tests involving observation of psycho-motor activity, reactivity to stimuli, and ability to perform normal, non-conditioned motor tasks. The compounds thus exhibit activity in hypertension and analgesia and are useful as anti-depressant and anti-anxiety agents. This activity indicates their usefulness as psychotropic agents.

The compounds of the present invention may be presented orally or parenterally and are preferably incorporated into a pharmaceutical formulation for such administration, either as the sole active ingredient or in combination with other pharmacologically active ingredients. For example, the oral preparations may be tablets, pills, powders, capsules, granules, suspensions, dispersions, solutions or emulsions which may contain diluents, binders, dispersing agents, surface active agents, flavoring agents, lubricating agents, coloring agents, coating materials, solvents, thickening agents or any other pharmaceutically acceptable additives where appropriate to produce the desired dosage form. Thus the compounds can be incorporated in unit dosage form as tablets or capsules for oral administration either alone or in combination with suitable adjuvants such as calcium carbonate, starch, lactose, talc, magnesium stearate, gum acacia, and the like or they can be formulated for oral administration in aqueous alcohol, glycol or oil solutions or oil-water emulsions in the same manner as conventional medicinal substances are prepared. The injectable form may be a substantially aqueous or non-aqueous solution, suspension or emulsion in a pharmaceutically acceptable liquid or mixture of liquids which may contain bacteriostats, antioxidants, buffers, solutes to render the formulation isotonic with the blood, thickening agents, suspending agents, or any other pharmaceutically acceptable additives where appropriate. Such injectable formulations are made sterile and may be presented in unit dose forms such as ampoules or disposable injection devices or in multi-dose forms such as bottles from which appropriate single doses may be withdrawn. The compounds can for example be prepared for use by dissolving under sterile conditions a salt form of the compounds in water, or an equivalent amount of a non-toxic acid, or in a physiologically compatible aqueous medium such as saline, and stored in ampoules for intramuscular injection.

The molecular structures of the compounds of our invention were assigned on the basis of a study of their infra-red, ultraviolet and n.m.r. spectra, of mass spectrometry and their transformation products; and they were confirmed by the correspondence of calculated and found values for the elementary analyses for representative examples.

It is also understood that the invention includes the foregoing benzopyran-5-ols having the pyran ring saturated and these dihydropyran compounds can be prepared from the benzopyran-5-ols quantitatively with Pd/C and $H_2$ in the manner described in the aforesaid Granchelli application.

What is claimed is:

1. A compound of the formula:

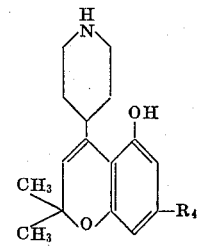

or a pharmaceutically acceptable salt thereof, wherein $R_4$ is n-pentyl, n-hexyl, n-heptyl, n-nonyl, 2-heptyl, 3-methyl-2-octyl, 2-nonyl, decyl, dodecyl, 2-tetradecyl, n-hexadecyl or 2-eicosanyl.

2. The compound of claim 1 wherein $R_4$ is n-pentyl, or a pharmaceutically acceptable acid addition salt thereof.

3. The compound of claim 1 which is 2,2-dimethyl-7-n-pentyl-4-(4-piperidinyl)-2H-1-benzopyran-5-ol.

* * * * *